United States Patent
Hiltbrunner et al.

(10) Patent No.: US 8,908,401 B2
(45) Date of Patent: Dec. 9, 2014

(54) MULTIPHASE SOFT-SWITCHED DC-DC CONVERTER

(75) Inventors: Max Hiltbrunner, Gunzgen (CH); Urs Christen, Pieterlen (CH); Hans-Rudolf Riniker, Aarau (CH)

(73) Assignee: APS Elctronic AG, Niederbuchsiten (CH)

( * ) Notice: Subject to any disclaimer, the term of this patent is extended or adjusted under 35 U.S.C. 154(b) by 643 days.

(21) Appl. No.: 13/054,978

(22) PCT Filed: Jul. 22, 2008

(86) PCT No.: PCT/EP2008/059607
§ 371 (c)(1),
(2), (4) Date: Jan. 20, 2011

(87) PCT Pub. No.: WO2010/009760
PCT Pub. Date: Jan. 28, 2010

(65) Prior Publication Data
US 2011/0127976 A1 Jun. 2, 2011

(51) Int. Cl.
*H02M 3/335* (2006.01)
*H02M 3/337* (2006.01)
*H02M 3/158* (2006.01)
*H02M 1/00* (2006.01)

(52) U.S. Cl.
CPC ...... *H02M 3/337* (2013.01); *H02M 2003/1586* (2013.01); *H02M 3/1584* (2013.01); *H02M 3/3378* (2013.01); *H02M 3/33538* (2013.01); *H02M 2001/0074* (2013.01)
USPC .................................. 363/71; 363/17; 363/20

(58) Field of Classification Search
USPC .............. 323/272; 363/17, 24, 65, 69, 71, 98, 363/132, 20
See application file for complete search history.

(56) References Cited

U.S. PATENT DOCUMENTS

| | | | |
|---|---|---|---|
| 4,415,959 A | 11/1983 | Vinciarelli | |
| 4,734,839 A | 3/1988 | Barthold | |
| 5,563,780 A | 10/1996 | Goad | |
| 5,796,595 A | 8/1998 | Cross | |
| 6,385,057 B1 * | 5/2002 | Barron | 363/17 |
| 6,388,904 B2 * | 5/2002 | Nomura | 363/71 |
| 6,574,125 B2 * | 6/2003 | Matsukawa et al. | 363/71 |
| 7,054,175 B2 * | 5/2006 | Kurio et al. | 363/65 |
| 7,518,886 B1 * | 4/2009 | Lai et al. | 363/17 |
| 8,289,743 B2 * | 10/2012 | Sato | 363/71 |
| 2004/0037100 A1 * | 2/2004 | Orr et al. | 363/131 |
| 2004/0196679 A1 * | 10/2004 | Apeland et al. | 363/132 |
| 2006/0171182 A1 * | 8/2006 | Siri et al. | 363/131 |

FOREIGN PATENT DOCUMENTS

EP        1 227 571        1/2002

OTHER PUBLICATIONS

International Search Report Application No. PCT/EP2008/059607, dated May 11, 2009.

* cited by examiner

*Primary Examiner* — Fred E Finch, III
(74) *Attorney, Agent, or Firm* — Pearne & Gordon LLP

(57) ABSTRACT

A high-frequency DC to DC converter comprising n transient converter circuits (1, 2 . . . n) operating in parallel. The converter has constant transfer characteristics, and the transient converter circuits are operated phase-shifted by 360°/n and with interleaved duty cycles, which results in a continuous energy transfer through the circuit. The circuit is also soft-switched, with very low switching losses. In particular, the active semiconductors only switch off a relatively small magnetization current, during a recovery phase which can last as long as (n−1)/n of the switching phase period.

14 Claims, 10 Drawing Sheets

MULTIPHASE SOFT-SWITCHED DC-DC CONVERTER

BACKGROUND OF THE INVENTION

1. Field of the Invention

The invention relates to the field of high-frequency DC-DC converters in which electrical power at a first voltage is transferred from a power source to a load at a second voltage by high-frequency switching of current through circuits containing inductive and other resonant components. In particular, the invention relates to a family of multiphase converters in which two or more converter circuit slices are used to transfer electrical energy in parallel by switching current through the circuits sequentially in packets of energy.

2. Description of the Related Art

A DC-to-DC converter is a circuit which converts a direct current voltage at one level to a direct current voltage at another level. One of the primary design goals in such DC-to-DC converters is to increase the amount of power transferred through the converter. Common prior art DC-to-DC converter topologies include the buck or forward converter, the buck-boost or flyback converter, and the boost converter, which transfer energy from the input to the output during part of the switching cycle. In these circuits a dead time was created during the energy transfer (discontinuous energy transfer) which resulted in the need for larger output filters. Subsequent designs, see for example U.S. Pat. No. 4,734,839 (Barthold), used combinations of topologies to achieve a continuous transfer of energy from the input to the output of the converter, which allowed a significant reduced size of output filter.

Increasing the switching frequency is also known to enable increased power transfer through the converter. This can also result in a reduction in the size of the output filter and, in the case of converters using galvanic isolation transformers, a reduced size of the isolation transformer. However, as frequency increases, so switching losses in semiconductor switches start to increase significantly, due to the finite switching speed or the time required for the current in the semiconductor device to start and stop flowing.

In order to overcome the problems inherent in using higher switching speeds, resonant and quasi-resonant DC-to-DC converters were developed which permitted zero-current (ZCS) and zero-voltage (ZVS) switching. In the case of quasi-resonant converters, the current or voltage is shaped to become half-sinusoidal, and the switching is timed to occur at the time when the current or voltage reaches zero. Parasitic capacitances and leakage inductances, which are normally considered a problem in such circuits operating at high frequencies, are incorporated in the circuit to define the resonance characteristics of the converter. An example of a quasi-resonant converter circuit can be found in U.S. Pat. No. 4,415,959 (Vinciarelli), which describes the cycles of charging a resonant capacitor during the on part of the operation cycle, and then, when the charging current reaches zero, switching the switch off, whereupon the output inductor discharges the resonant capacitor, transferring the energy to the load. By switching at zero current, this topology reduces switching losses, which allows the converter to run at a higher frequency.

However, such quasi-resonant converter circuits still require relatively large capacitors for storing the amounts of charge necessary, and at the operating voltage. Switching timing is also critical, which means that the control of the circuit operation is a non-trivial task, and may require a relatively complex design, or very low tolerance (ie expensive) resonance components and care over modelling parasitic. If the circuit is switched sub-optimally, or not correctly matched to the resonant components, then switching losses and inefficiency can result.

The invention also relates to arrangements of two or more convertors operated in parallel. As is already known, there are significant advantages in using two or more converter circuits to transfer energy in parallel from a common power source to a common load: U.S. Pat. No. 5,796,595 (Cross) describes a converter circuit which includes two soft-switching resonant converters operating in parallel. The switching sequence is interleaved, phase shifted by 180° between the two circuits, so as to provide power transfer during both halves of the switching cycle. Switching is carefully timed such that the switches are turned on while the voltage across them, and the current through them, are near zero, thus reducing switching losses. This converter circuit, however, still requires a relatively large input capacitor to cope with the voltage swings across it and a relatively complicated control unit to generate the required pulse-width modulation and interleaved soft-switching timing in the primary and secondary switches. Since it is based around the use of transformers with leakage inductance, it also uses a clamp circuit to recycle energy stored in the leakage inductance after each cycle in order to achieve zero-voltage switching of the power switches.

U.S. Pat. No. 5,563,780 (Goad) describes a power converter in which multiple smaller converters are connected in parallel between the power source and the load, and in which the smaller converters are switched sequentially and pulse-width modulated such that at least two of converters are always on at any one time.

It is an aim of the invention to provide a high-frequency DC-DC converter which provides continuous energy transfer at very high efficiency, with very low ripple voltage on the output, which requires less smoothing on the output, which has significantly reduced switching losses, which has simplified control circuitry, which does not require balancing circuitry, which requires a small number of components and in which the power rating of the components can be reduced relative to the overall power rating of the converter.

SUMMARY OF THE INVENTION

The invention lies in the power converter as described in the appended claims. There is an entire family of variants which can use the principles underlying the present invention, however the invention will initially be described in generalized terms by means of a simplified circuit and timing analysis in order to demonstrate the principle. Various embodiments of the invention will then be described in more detail.

The invention lies in the operation of two or more converter circuits in parallel, in sequencing the operation of the converter circuits in a staggered, multiphase fashion, and in the topology which ensures that energy transfer phases pass from one converter circuit to the next at exactly the right point to enable zero current and zero voltage switching, without presetting this timing in the control circuitry.

Each converter circuit comprises a capacitor and an inductor, and a switching circuit for controlling the current flow through the converter circuit. A diode at the output ensures that current cannot flow into the circuit from the output. This diode plays an important role in the phase-switching of the multiphase circuit, as will be described later. Each converter circuit is cyclically switched between two phases: an energy transfer phase and a regeneration phase. When the switch is open, the circuit is in the regeneration phase, and the capacitor charges from the power source, steadily accumulating electrical energy. When the switch is closed, the circuit enters the energy transfer phase, during which energy is delivered from the capacitor to the output through the inductor.

The converter circuit of the invention is designed specifically to operate as one slice in a multi-slice circuit, in which two or more such circuits are connected in parallel to transfer energy to a common load, one at a time, in sequential, staggered fashion. The energy flow transfers automatically from one converter to the next when the latter converter is switched on. The timings of the transitions are governed by the values of the components of each converter circuit, and the converter circuits are designed such that, once a transition from one converter to the next is complete, the previous converter can be switched off under zero current conditions.

In its simplest form, the invention consists of two or more parallel converter circuits, each comprising a capacitor across the input, a switch, an inductance, and a diode. The outputs of the converter circuits are connected together to a common load. The converter circuits are driven in round-robin fashion, such that each takes it in turn to deliver its energy to the load. As will be described in more detail, the particular circuit layout, in conjunction with the particular timing and switch-control sequence, means that the succession from one converter circuit to the next in the cycle happens very simply, as the activation of one converter circuit necessarily de-activates the others.

The invention will also be described by means of an example circuit having two converter circuits operating with an interleaved and overlapping switching cycle. However, it should be understood that the invention is not limited to the two-converter case, and includes any arrangement of two or more converter circuits arranged with this topology and operating with the overlapped and interleaved switching operation.

In one embodiment of the invention, the switching for each converter is performed by a full bridge configuration of semiconductor switches, which can be IGBT transistors, for example. The components and the switching timing are arranged so that each switched pair of transistors in the full bridge circuit only switches in a soft-switching mode, ie it only switches on or off when the current through the pair is either zero or very small. Switching off is achieved while there is only a small residual magnetization current from the transformers, while switching on occurs under conditions of zero current with a zero or very small voltage present.

The use of semiconductor switches in this interleaved arrangement means that there is a period during the off-phase of each half of the switching cycle during which the extra charge carriers arising in the semiconductors from the load current are able to recombine before the switches need to switch off the relatively small magnetization current of the transformer. In the case of the two-converter, dual polarity configuration, up to half of the off-phase time (ie up to one eighth of the full cycle time) is available for this recombination to take place.

This soft-switching arrangement reduces, or virtually eliminates, the switching losses in the semiconductor switches and thereby increases the total efficiency of the converter circuit.

Another advantage of the present invention, in the embodiments which make use of transformers, is that the voltage required for the commutation of the transformer currents is only a small fraction of the operating voltage of the circuit. As a result, much smaller components may be used, for example in high voltage applications, as the switching components are only required to work at this lower additional commutation voltage.

A further advantage of the invention is that the switching on and off of the load current in the diodes on the output side of the circuit occurs at a known, constant rate.

DESCRIPTION OF THE INVENTION

Figure 1:
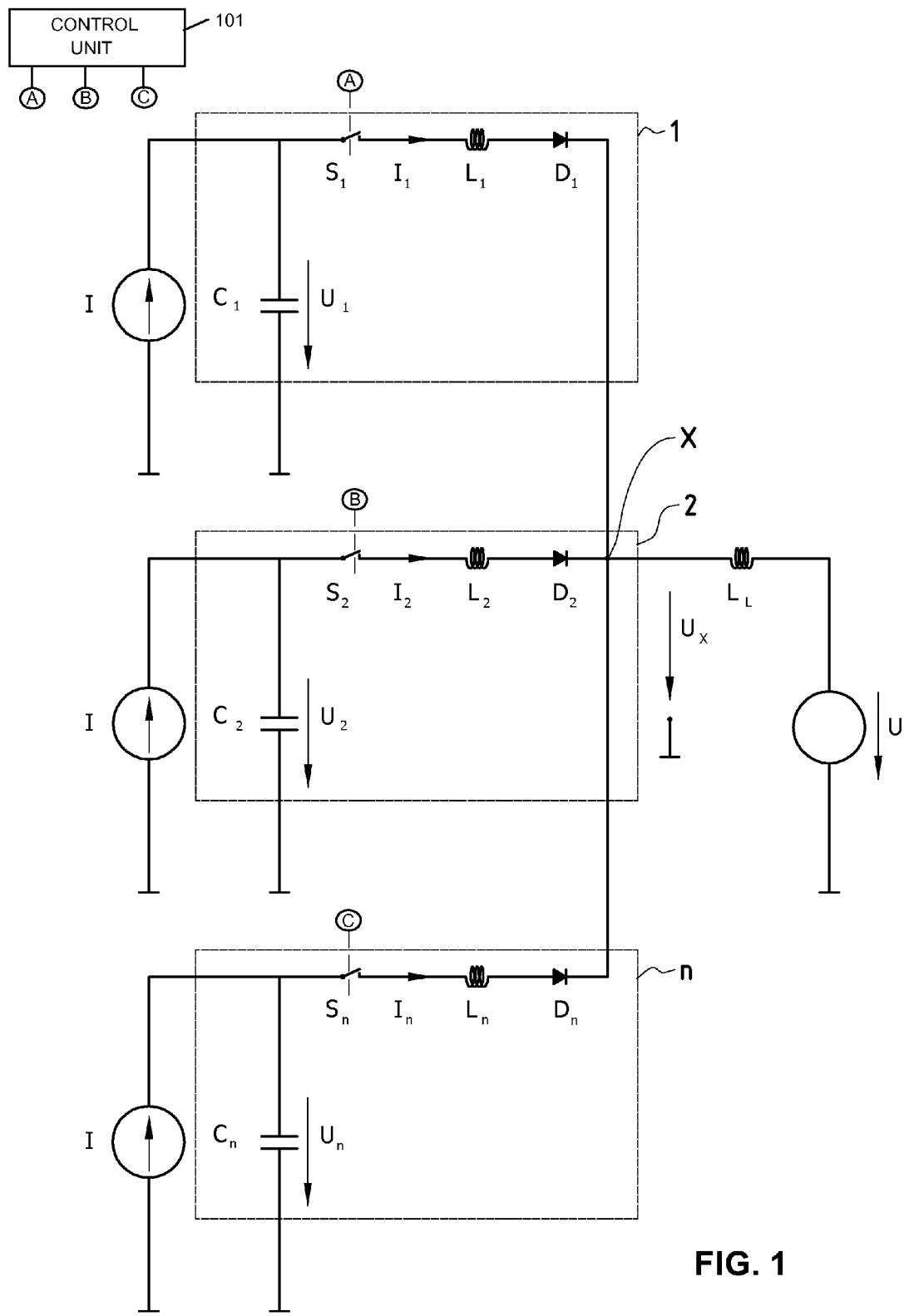
FIG. 1 illustrates three converter circuits connected to a common load circuit.

FIG. 1 illustrates a simplified abstraction of the principle behind the present invention. The circuit shows three converter circuits (1, 2, n) connected to a common load circuit. Each converter circuit comprises a capacitor ($C_1$, $C_2$, $C_n$), a switch ($S_1$, $S_2$, $S_n$), an inductance ($L_1$, $L_2$, $L_n$) and an output diode ($D_1$, $D_2$, DO. The voltages across the capacitors are $U_1$, $U_2$ and $U_n$ respectively. A control unit 101 controls the operation of the switch ($S_1$, $S_2$, $S_n$) in each converter circuit (1, 2, n).

Figure 2:
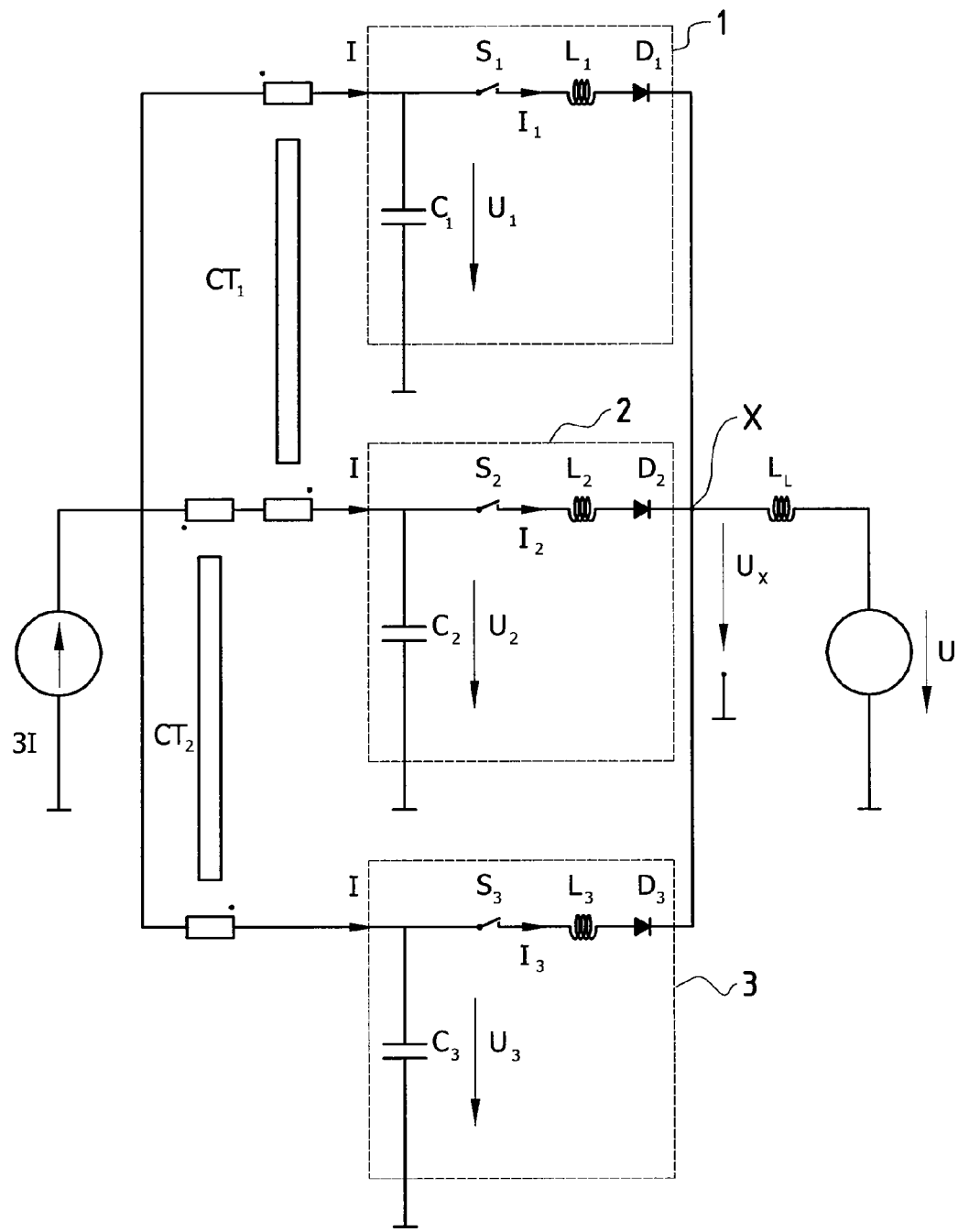
FIG. 2 illustrates an arrangement of three converter circuits sharing one ideal current source by means of two ideal current transformers to form three ideal current sources.

The circuit of FIG. 1 shows each converter circuit having a separate ideal current source I, however it will be understood that they may equally share a common current source. Such an arrangement is shown in FIG. 2, which shows three converter circuits sharing one ideal current source (3I) by means of two ideal current transformers ($CT_1$, $CT_2$) to form three ideal current sources (I). In the general case, with n converter circuits in parallel, (n−1) ideal current transformers would be required.

Figure 3:
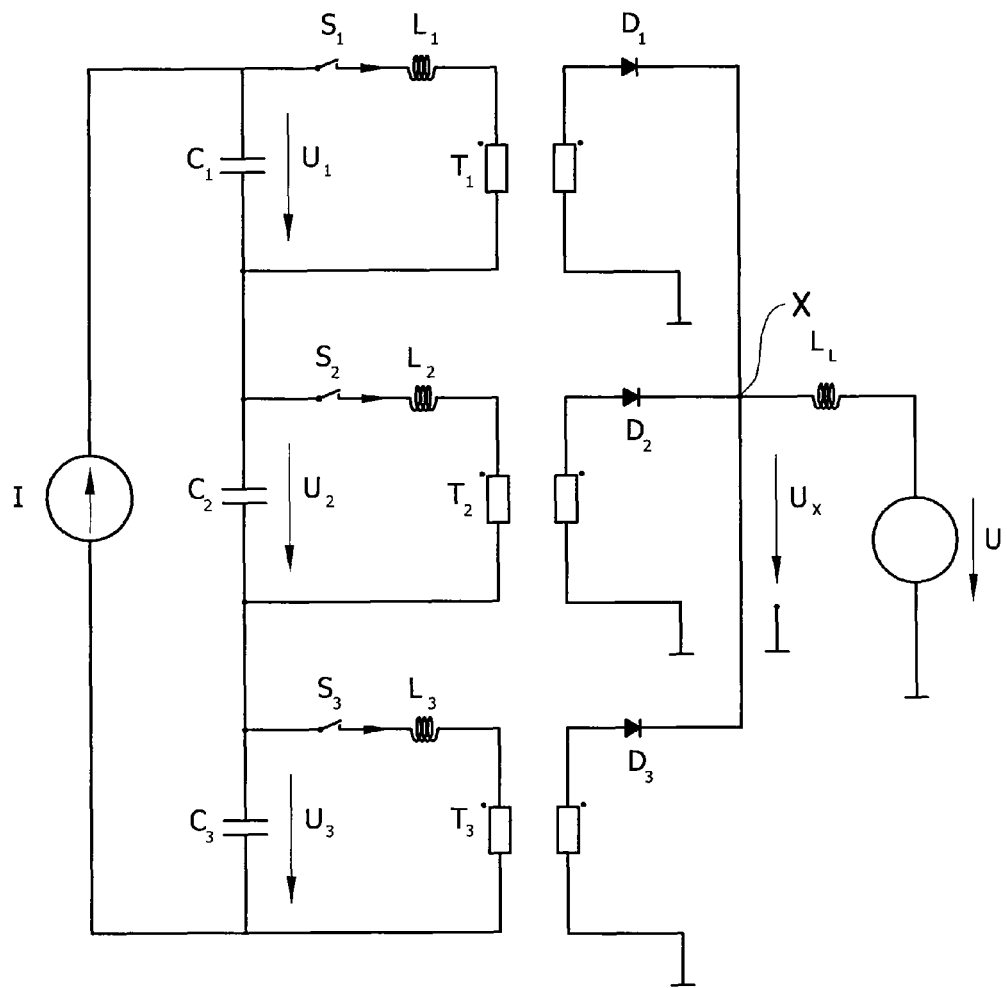
FIG. 3 illustrates a galvanically isolated version of the circuit of FIG. 2.

FIG. 3 illustrates a galvanically isolated version of the circuit of FIG. 2. In this case, the converter circuits have been implemented with ideal transformers, which enables the primary sides of the transformers to be connected together in series. The three separate ideal current sources of FIG. 1 can be combined into one ideal current source (I). For circuits where a galvanic isolation is required, this variant is ideal, since the circuit is particularly compact and simple to implement.

Figure 4:
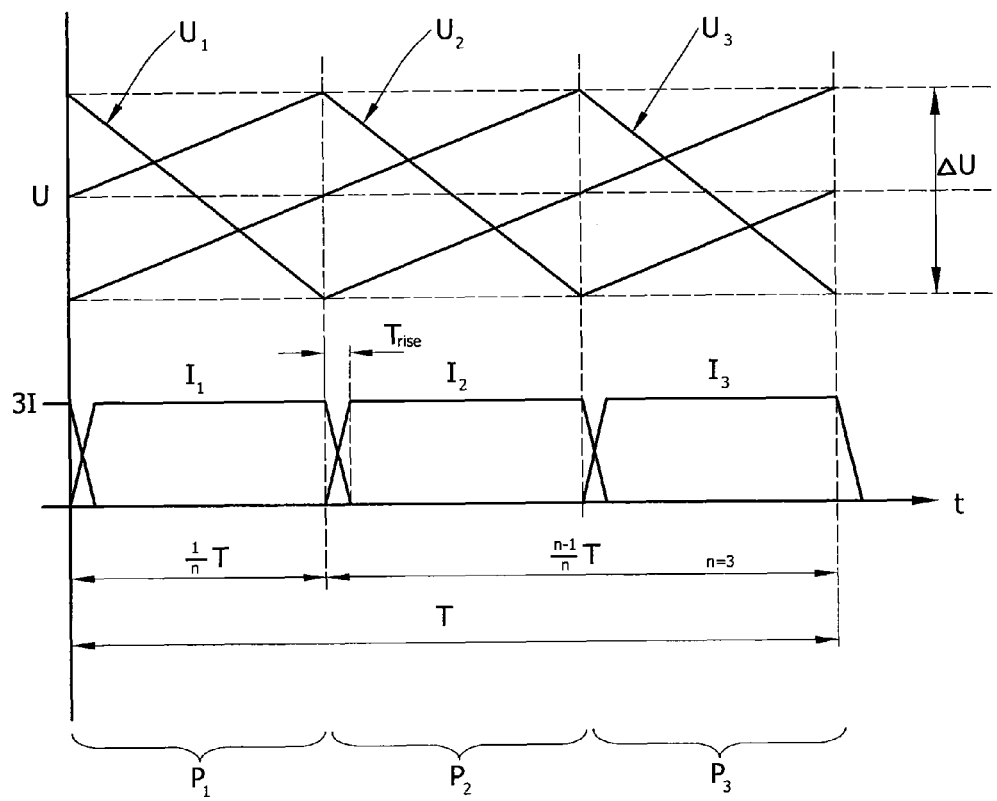
FIG. 4 shows one complete switching cycle (T) for a circuit with three converter circuits.

The operation of the abstracted circuit in FIG. 1 will now be described with reference to FIG. 4. In the illustrated timing diagram of FIG. 4, the number of converter circuit slices, n, is taken to be 3, for ease of understanding. FIG. 4 shows one complete switching cycle (T) for a circuit with three converter circuits. The voltages $U_1$, $U_2$ and $U_3$ across the three capacitors ($C_1$, $C_2$, $C_3$) are shown, together with the corresponding currents ($I_1$, $I_2$, $I_3$) flowing in the individual circuits. What is not shown in FIG. 4 is the operation of the switches, however it should be understood each of the three phases shown in FIG. 4 ($I_1$ being high, $I_2$ being high and $I_3$ being high) is brought about by the closing of the corresponding switch ($S_1$, $S_2$ or $S_3$).

At the beginning of the phase $P_1$ shown in FIG. 4, $U_1$ is at its highest point in the cycle. That is to say that $C_1$ is charged to its maximum charge in the cycle. At this point $S_1$ closes, allowing current $I_1$ to flow through $L_1$ and $D_1$ to the output. Note that the current $I_1$ cannot begin to flow instantaneously, since it is flowing through an inductor. However its gradient is constant, and is determined by the inductance of $L_1$. Once established, current $I_1$ has a value of 3I, of which 2I comes from the discharging of $C_1$, and 1I comes from the ideal constant current source I. The discharging of $C_1$ at a rate of 2I forces the voltage $U_1$ to fall linearly, as shown in FIG. 4.

Phase $P_1$ is also referred to as the energy transfer phase of converter circuit 1. During this phase, switches $S_2$ and $S_3$ have both been off, therefore no current flows in either of the converter circuits 2 or 3. These converter circuits are in the regeneration state during this phase $P_1$, and $C_2$ and $C_3$ are both charging.

At the end of $P_1$, however, switch $S_2$ is closed and phase $P_2$ begins. At this point, $S_1$ may remain closed. However, as soon as $S_2$ is closed, the voltage $U_2$ across $C_2$ appears at the output of converter 2. $U_2$ is higher than $U_1$, therefore $D_1$ becomes reverse biased, and current is therefore inhibited from flowing in converter 1. $I_1$ cannot stop instantaneously, since it is flowing through inductor $L_1$. In fact $I_1$ decays at a rate, as shown in FIG. 4, equal and opposite to the simultaneous increase in $I_2$.

Since $I_1$ decays at the same rate that $I_2$ increases, and since the changes are simultaneous, the sum of $I_1$ and $I_2$ remains constant at the transition from $P_1$ to $P_2$. This means that the transition from the energy transfer phase of one converter circuit to the energy transfer phase of the next converter circuit occurs without any change in the current flow to the load circuit.

Note that, once converter circuit 2 has been activated by closing switch $S_2$, switch $S_1$ can be opened. However, when semiconductor switches are used, the opening of switch $S_1$ should be left until after $I_1$ has decayed to zero in order to achieve zero-current switching (ZCS) conditions and thereby reduce switching losses. Note also that capacitor $C_1$ begins to charge (ie $U_1$ begins to increase) as soon as switch $S_2$ is closed, and that the switching off of $S_1$ must happen before $U_1$ reaches the same value as $U_2$ (this conjunction happens two thirds of the way through phase $P_2$ as can be seen in FIG. 4).

When $U_1$ becomes greater than or equal to $U_2$, diode $D_1$ is no longer reverse biased, which means that, if $S_1$ were still closed at this point, current would begin to flow again from $C_1$ to the load, resulting in the disruption of the operation of the whole circuit.

There is therefore a window for switching off each switch after its corresponding energy transfer phase, and the duration of the time period available can be calculated: in the case of three converter circuits, the time available is ⅔ of the length of the switching phase, minus $T_{rise}$. In the general case, with n converter circuits, the time available is $T(n-1)/n^2 - T_{rise}$. When $T \gg T_{rise}$, this approximates to $T(n-1)/n^2$.

As will be seen in later analysis of specific embodiments, this relatively long time available for opening each switch can be highly advantageous when using insulated gate bipolar transistor (IGBT) semiconductor switches, since it allows time for the free charge carriers in the semiconductor material, which remain free in the base region after current has ceased to flow, to recombine before the device is switched off.

Note also that each capacitor is only required to charge and discharge by a relatively small voltage difference, in contrast to conventional resonance converters, in which the capacitor must fully discharge in order to provide the conditions for zero-current switching off. This relatively small voltage difference implies a similarly small charge to be stored and released during each cycle, which means that the capacitances are much smaller (hence cheaper and less bulky) than in conventional circuits. This difference in capacitances may be several orders of magnitude. In combination with the favourable conditions for zero current switching described above, the much smaller capacitances also mean that the converter can be driven at significantly higher frequencies without significantly increasing switching losses in semiconductor switches, and without causing electromagnetic radiation due to imperfect zero current switching because of residual currents from leakage inductance of the inductors, as would be the case in conventional converters.

As will be understood, similar transitions occur between the energy transfer phase of each converter circuit and that of its successor in the sequence of operation.

The foregoing description relates to the generalized case, and the behaviour of the generalized circuit has assumed, ideal characteristics of current sources, inductances and so on. However, the principle of operation of the generalized circuit is applicable in many practical implementations of the invention. Some of these variations are described hereafter, however it will be understood by the person skilled in the technical field that many other variations are possible without departing from the principles underlying the invention.

Further Examples of Embodiments of the Invention

Figure 5:
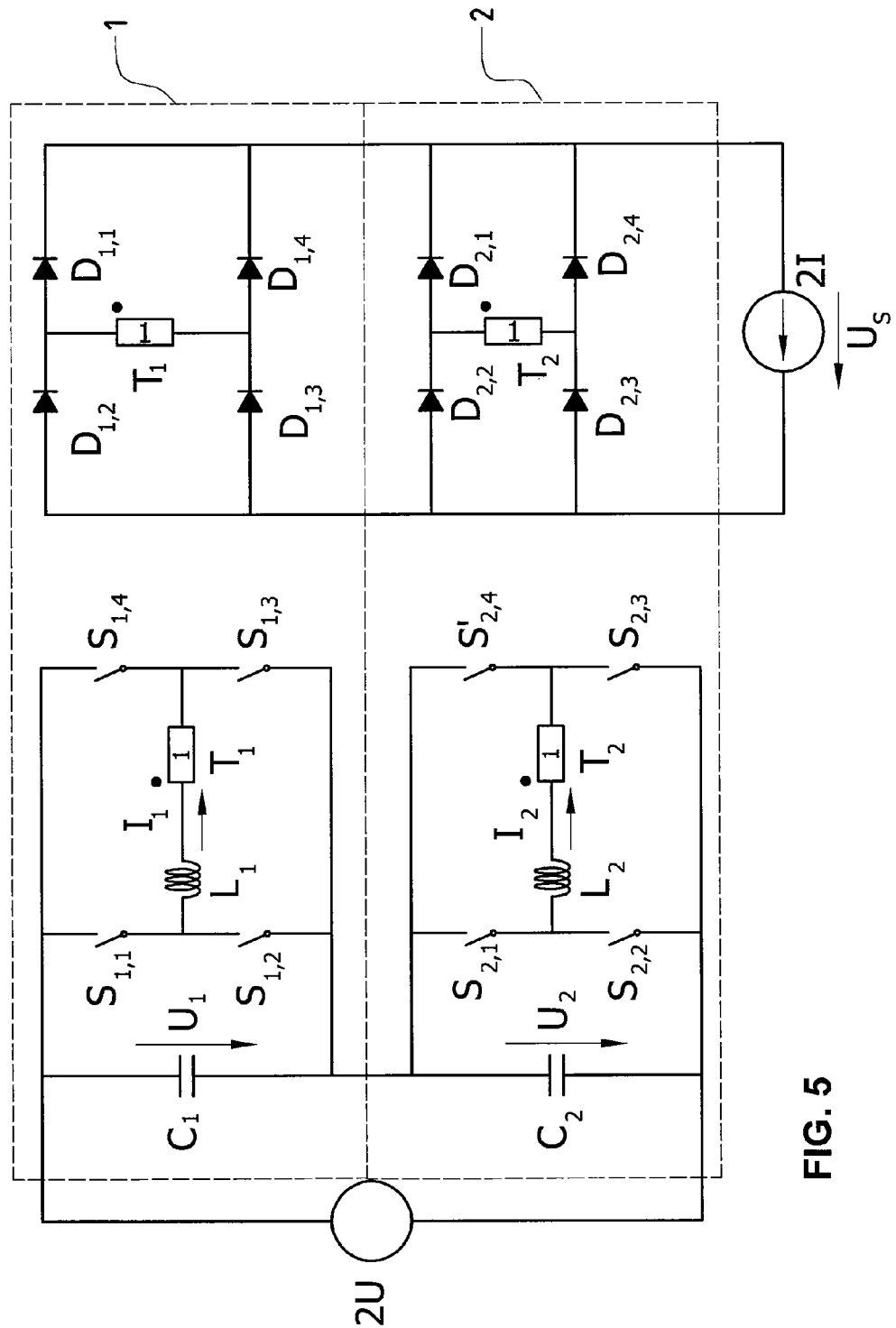
FIG. 5 illustrates an example implementation of the invention using two converter circuits.

FIG. 5 illustrates an example implementation of the invention using two converter circuits similar to the arrangement of FIG. 3. The switches $S_1$ and $S_2$ are implemented in this case as full-bridge switches, and the diodes $D_1$ and $D_2$ are realized using full-bridge rectifiers. This combination allows a dual polarity operation of each converter circuit, meaning that current can be switched to flow in alternating polarity through the primary windings of the transformers, and therefore also through the secondary windings. The first converter circuit of FIG. 5 has a primary side circuit which comprises capacitor $C_1$ and a switching bridge ($S_{1,1}$, $S_{1,2}$, $S_{1,3}$, $S_{1,4}$) for delivering current of alternating polarity to the primary winding of transformer $T_1$ via inductance $L_1$. The first converter also has a secondary side which comprises the secondary winding of transformer $T_1$ and a rectifying bridge ($D_{1,1}$, $D_{1,2}$, $D_{1,3}$, $D_{1,4}$).

Similarly, the second converter unit has a primary side circuit which comprises capacitor $C_2$ and a switching bridge ($S_{2,1}$, $S_{2,2}$, $S_{2,3}$, $S_{2,4}$) for delivering current of alternating polarity to the primary winding of transformer $T_2$ via commutation inductance $L_2$. The second converter also has a secondary side which comprises the secondary winding of transformer $T_2$ and a rectifying bridge ($D_{2,1}$, $D_{2,2}$, $D_{2,3}$, $D_{2,4}$).

The secondary sides of the first and second converters are connected in parallel to supply power to a load (current sink 2I).

On the primary side, the circuits are connected in series, so that switched current supplied by the power source 2U is delivered through the transformers' primary windings via $C_1$ and $C_2$. As will be seen in the analysis of the switching sequence which follows, the circuit is designed such that half of the current delivered to the primary winding of transformer $T_1$ during its on cycle comes from charge stored in $C_1$, while the other half comes from the power source 2U via capacitor $C_2$. This series connection arrangement of the capacitors means that, while each capacitor is still required to allow relatively large dynamic current flow, they are required to operate at approximately half the voltage of a similar capacitor operating in a conventional converter circuit. In the case of three or four circuits connected in such an arrangement, each capacitor would only be required to work at a third or a quarter of the supply voltage.

The primary side switching bridges are preferably composed of semiconductor power transistors such as conventional insulated gate bipolar transistors (IGBTs). As is conventional when driving inductive loads, the semiconductor switches ($S_{1,1}$, $S_{1,2}$, $S_{1,3}$, $S_{1,4}$, $S_{2,1}$, $S_{2,2}$, $S_{2,3}$, $S_{2,4}$) may also each be equipped with a freewheeling diode to allow any reverse current from the inductive load to pass without stressing the switch transistor. These diodes are not shown in the circuit diagram of FIG. 5.

Also not shown in FIG. 5 is the control circuitry. However, it will be understood that the operation of each of the switches is controlled by a separate unit such that the pairs of switches ($S_{1,1}$ and $S_{1,3}$, for example) in the bridges are switched simultaneously. The timing of the individual switch control signals is controlled by controller unit similar to control unit 101.

It is noted that the commutation inductances $L_1$ and $L_2$ in the circuit of FIG. 5, while they are represented as separate components for ease of understanding, can be implemented by means of the leakage inductance of the transformers for all variants of the circuit using such galvanic isolation devices.

The energy transfer characteristics of the primary side circuits are determined by the values of the capacitances ($C_1$, $C_2$) and the inductances ($L_1$, $L_2$). As will become clear in the following timing sequence analysis, the operating frequency and the values of the components are chosen such that, when the primary current is switched through $L_1$ and $L_2$, the voltages across $C_1$ and $C_2$ vary by a maximum ripple voltage amount (designated as $\pm\Delta U$).

The operation of the circuit in FIG. 5 will be described with reference to the timing diagram of FIG. 6. Note that the values of $C_1$ and $C_2$ are chosen to be small enough so that the ripple voltage $\Delta U$ is large enough to be used to commutate the current from one transformer to the other within the time available in the switching sequence. As has been described previously, the choice of small capacitor values, together with a judicious definition of the switching timing, enables a set of conditions to be created in which the semiconductor switches can be switched at zero voltage and current (soft-switching), and in which the voltages and currents are distributed evenly between the primary-side circuits of the two converters, thus avoiding the need for extra balancing circuitry as often required in conventional resonant converter circuits. The smaller capacitors have the additional advantages of taking up less space and being less expensive.

Timing Sequence of the Dual Polarity, Interleaved Switching Example

Figure 6:
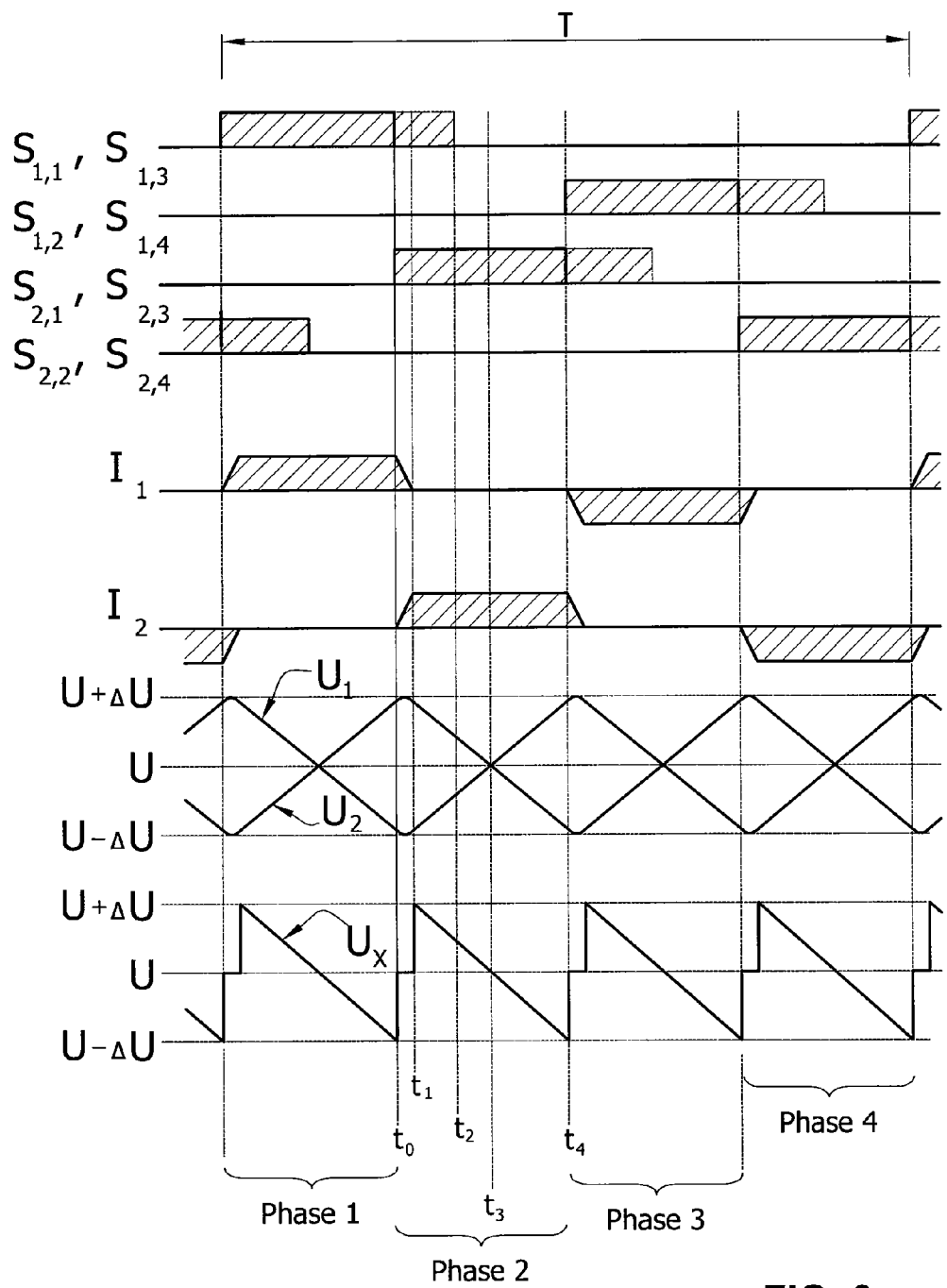
FIG. 6 is a timing diagram of the current and voltage changes in the circuit of FIG. 5.

The following detailed description refers to the timing diagram of FIG. 6, which describes the current and voltage changes in the two-converter example circuit of FIG. 5. FIG. 6 shows the transitions which happen during one complete switching cycle, with a more detailed timing analysis of the transitions which take place during the second phase of the cycle. It should be understood that a similar sequence of transitions also takes place during the other three phases of the example shown.

Time $t_0$

At time $t_0$, $S_{1,1}$ and $S_{1,3}$ are already both on, and current 2I flows through $L_1$ and the primary winding of $T_1$. $C_1$ supplies half (I) of this current, and the other half comes from 2U via $C_2$.

A current 2I from the secondary winding of $T_1$ flows via $D_{1,1}$ and $D_{1,3}$ to the current sink. $U_1$, the voltage across $C_1$, is $U-\Delta U$, and $U_2$, the voltage across $C_2$, is $U+\Delta U$. $U_S$, the voltage across the current sink, is $U-\Delta U$.

Period $t_0$-$t_1$

At time $t_0$, $S_{2,1}$ and $S_{2,3}$ switch on. The switch-on voltages to $S_{2,1}$ and $S_{2,3}$ are each $\Delta U$. $D_{2,1}$ and $D_{2,3}$ therefore also begin to conduct on the secondary side. The voltage across $L_1$ is now $-\Delta U$, $+\Delta U$ across $L_2$ and U across the current sink 2I. This leads to the current 2I through $L_1$ and $T_1$ decaying at the rate $\Delta U/L_1$, and the current through $L_2$ and $T_2$ increasing at the rate $\Delta U/L_2$. At time $t_1$, the current through $D_{1,1}$ and $D_{1,3}$ has decayed to zero, and both diodes turn off. Now a current 2I flows through the secondary winding of $T_2$ and $D_{2,1}$ and $D_{2,3}$ into the current sink 2I. The voltage $U_S$ across the current sink 2I is now $U+\Delta U$.

Note that half of the area under the curve $I_2$ during the on-phase following $t_0$ represents the amount of charge delivered by $C_2$ to $L_2$ and $I_2$ during a change in the capacitor voltage $U_2$ from $U+\Delta U$ to $U-\Delta U$.

The magnitude of the ripple voltage $\Delta U_2$ is determined by the magnitude of $I_2$. A larger current $I_2$ requires a greater commutation swing, which would normally mean an increased commutation time. However, since $\Delta U_2$ is also correspondingly larger, the commutation gradient is also steeper, which compensates for the increased magnitude of $I_2$ such that the commutation time $t_0$-$t_1$ remains constant for different values of $I_2$ and $U_2$. This results in a constant and load-independent timing of the switches.

Time $t_1$ $S_{2,1}$ and $S_{2,3}$ pass a current 2I via $L_2$ and the primary winding of $T_2$. $C_2$ now supplies one half, I, of this current, and the voltage source 2U, via $C_1$, provides the other half. The secondary winding of $T_2$ conducts the current 2I via $D_{2,1}$ and $D_{2,3}$ to the current sink. At time $t_1$ the voltage $U_1$ across $C_1$ is $U-\Delta U$. The voltage $U_2$ across $C_2$ at time $t_1$ is $U+\Delta U$. The voltage $U_s$ across the current sink at time $t_1$ is $U+\Delta U$.

Period $t_1$-$t_2$ $S_{1,1}$ and $S_{1,3}$ remain switched on in the period $t_1$-$t_2$. However, they are now only passing the relatively small magnetization current from the primary winding of $T_1$. If insulated gate bipolar transistors (IGBT) are used as active semiconductors, the now surplus charge carriers will recombine during this period $t_1$-$t_2$. The voltage $U_2$ across $C_2$ decreases at a rate of $I/C_2$, and the voltage $U_1$ across $C_1$ increases at a rate $I/C_1$.

Time $t_2$

At time $t_2$, $S_{1,1}$ and $S_{1,3}$ are switched off. The magnetisation current of $T_1$ now recharges the parasitic capacitances of $T_1$, $S_{1,1}$, $S_{1,3}$, $S_{1,2}$, $S_{1,4}$, $D_{1,1}$, $D_{1,3}$, $D_{1,2}$ and $D_{1,4}$. If the voltage across $T_1$ has changed its polarity, the magnetization current of $T_1$ flows through the freewheeling diodes of $S_{1,2}$ and $S_{1,4}$. If no freewheeling or antiparallel diodes are present at the switches $S_{1,1}$, $S_{1,3}$, $S_{1,2}$ and $S_{1,4}$ then the voltage across $T_1$ not only changes polarity, but rises further until diodes $D_{1,2}$ and $D_{1,4}$ become forward-biased and conduct the magnetizing current of $T_1$. At that time, switches $S_{1,2}$ and $S_{1,4}$ are reverse-biased by a voltage not higher than $\Delta U$. Thus the time $t_2$ must be selected such that the voltage $U_2$ across $C_2$ is the same or greater than the voltage $U_1$ across $C_1$, otherwise the switched-off diodes $D_{1,1}$ and $D_{1,3}$ will begin to conduct again.

Period $t_2$-$t_3$

The voltage $U_2$ across $C_2$ continues to decrease at a rate of $I/C_2$, and the voltage $U_1$ across $C_1$ continues to grow at a rate $I/C_1$.

Time $t_3$

If, at time $t_3$, the voltage $U_1$ is greater than the voltage $U_2$, the diodes $D_{1,2}$ and $D_{1,4}$ become conducting, and the magnetisation current of $T_1$ commutates from the freewheeling diodes of $S_{1,2}$ and $S_{1,4}$ to $D_{1,2}$ and $D_{1,4}$.

Period $t_3$-$t_4$

The voltage $U_1$ across $C_1$ continues to increase, and the voltage $U_2$ across $C_2$ continues to fall. Reverse voltage builds up across $S_{1,2}$ and $S_{1,4}$, which reaches the value $\Delta U$ at time $t_4$.

Time $t_4$

At time $t_4$, the switching process described from $t_0$ to $t_4$ begins again. Where the current 2I commutated at the point in time $t_o$ from $S_{1,1}, S_{1,3}, D_{1,1}, D_{1,3}$ and $T_1$ to $S_{2,1}, S_{2,3}, D_{2,1}, D_{2,3}$ and $T_2$, instead the current 2I commutates at the point in time $t_4$ from $S_{2,1}, S_{2,3}, D_{2,1}, D_{2,3}$ and $T_2$ to $S_{1,2}, S_{1,4}, D_{1,2}, D_{1,4}$ and $T_1$. This commutation process repeats itself together with the remaining semiconductors a total of four times in each period T.

The phase-shifted operation of the series-parallel arrangement described in FIGS. 5 and 6 has been described with two converter units, each unit being active for the energy transfer for two interleaved quarter-cycles.

However, this modular structure may be extended to three or more converter units, each unit handling the appropriate fraction of the complete transfer cycle. Taking the generalised case with n similar converter units working phase shifted in combination, each of the n converter units will handle 1/n of the full cycle energy transfer, with the control signals being phase-shifted by 180°/n between units. For each switching circuit in the converter units, the time available for switching off the switches and for changing the polarity of the transformer voltage can be calculated as (n−1)/(2n) of the total cycle time.

Figure 7:
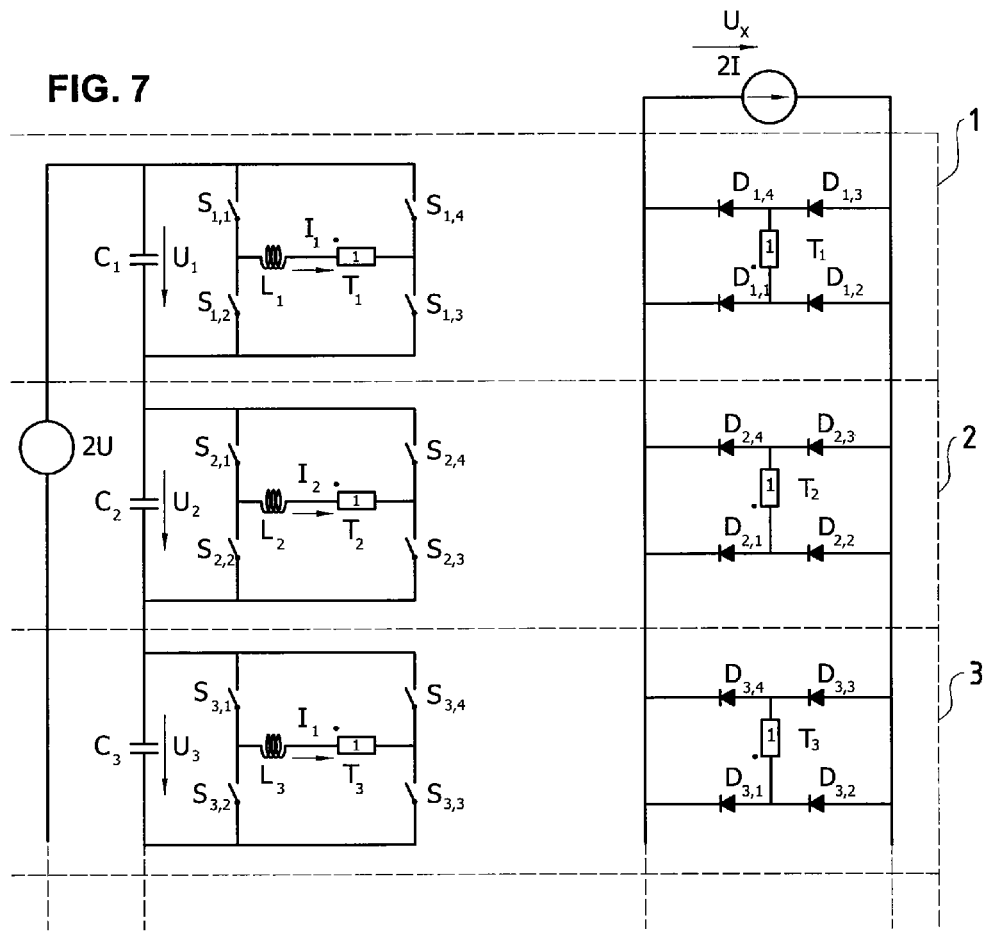
FIG. 7 is an en example of how the circuit of FIG. 5 may be extended in a modular fashion.

An example of how the circuit of FIG. 5 may be extended in such a modular fashion is illustrated in FIG. 7. A corresponding timing sequence for this configuration is not shown, but it will be understood that the cycle is similar; instead of being divided into four 90° switching phases, the cycle is divided by n, to give 2n phases of 180°/n each, where n is the number of converter circuits used.

Figure 8:
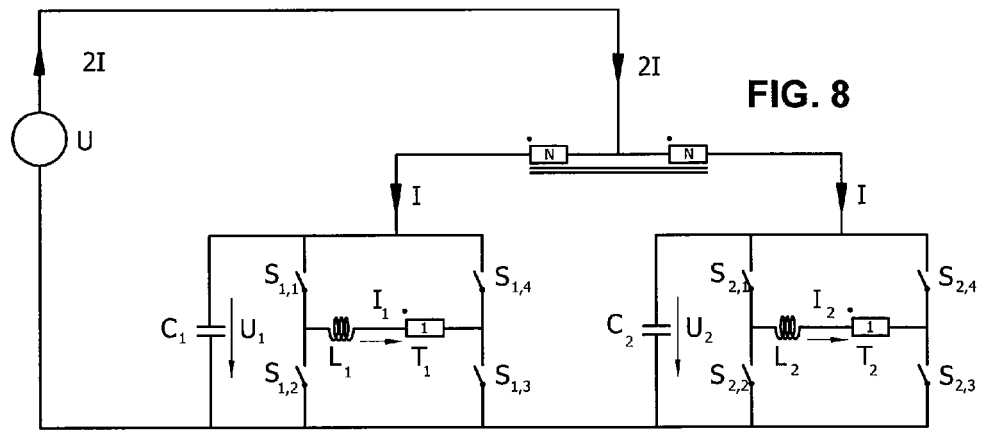
FIG. 8 shows how the series arrangement of the semiconductor bridges on the primary side of the converter circuits in FIG. 5 can be replaced, with the aid of a current transformer, by an equivalent circuit configured as a parallel connection of the semiconductor bridges.

FIGS. 8 to 10 illustrate various examples of circuit configurations which may be used in the converter circuits without departing from the scope of the invention.

FIG. 8, for example, shows how, in common with all types of bridges, the series arrangement of the semiconductor bridges on the primary side of the converter circuits in FIG. 5 can be replaced, with the aid of a current transformer, by an equivalent circuit configured as a parallel connection of the semiconductor bridges. The primary side of such a variant is illustrated in FIG. 8 (the secondary side of the circuit remains identical to the secondary side of the circuit illustrated in FIG. 5). The timing sequence and waveforms for the circuit of FIG. 8 are also identical to those shown in FIG. 6. An additional advantage of using the invention in the configuration of FIG. 8 is that the current transformer is only required to work under small voltages, up to $\Delta U$, which means that the rated power of the current transformer is only a small fraction of the rated power of the whole circuit.

Figure 9A:
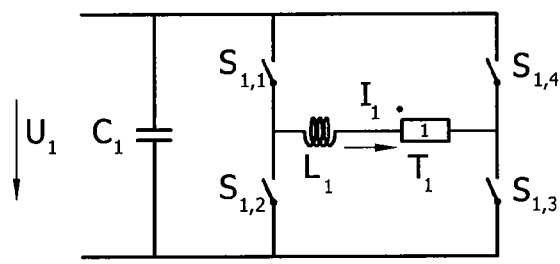
FIGS. 9a, 9b and 9c illustrate examples of possible configurations that may be used for the switching circuit on the primary side of each converter circuit.
Figure 9B:
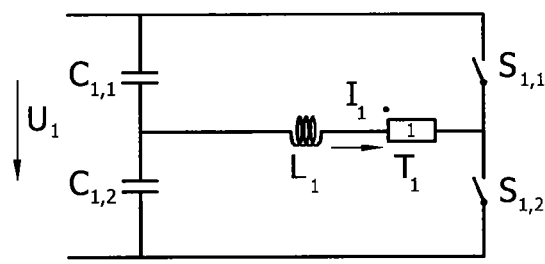
Figure 9C:
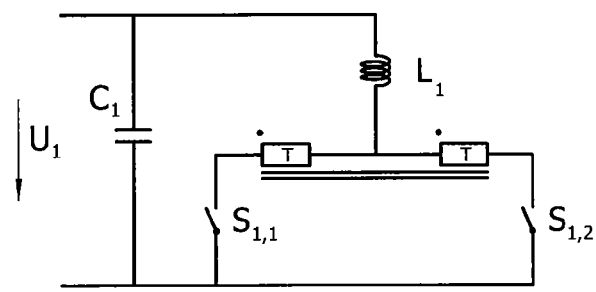

FIG. 9 illustrates some example of the range of possible configurations which may be used for the switching circuit on the primary side of each converter circuit. FIG. 9a shows the full bridge arrangement which is already illustrated in FIGS. 5, 7 and 8. FIG. 9b shows a half-bridge circuit which may be used instead of the full bridge circuit described in FIG. 9a. In this case, switches $S_{1,1}$ and $S_{1,2}$ replace the combinations of $(S_{1,1}, S_{1,3})$ and $(S_{1,2}, S_{1,4})$ respectively in the switching sequence, and capacitances $C_{1,1}$ and $C_{1,2}$ replace $C_1$. FIG. 9c shows a push-pull switching configuration which may be used instead of the full bridge circuit of FIG. 9a. In this case centre-tapped primary windings are used in the transformer. The inductance $L_1$ may nevertheless still be implemented by the leakage inductance in these primary windings.

Figure 10A:
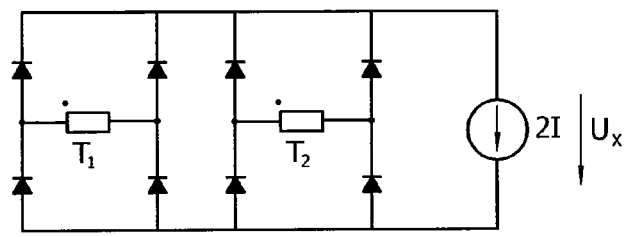
FIGS. 10a, 10b and 10c illustrate alternative circuits that may be used for the secondary side of the converter circuits in FIGS. 5 and 7.
Figure 10B:
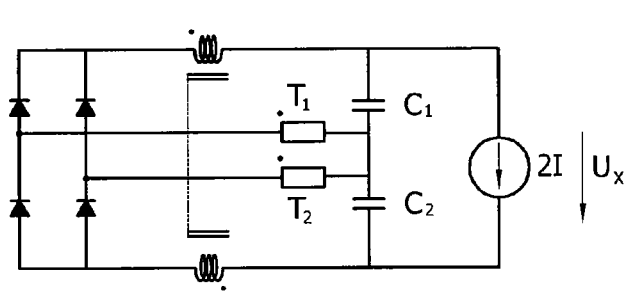
Figure 10C:
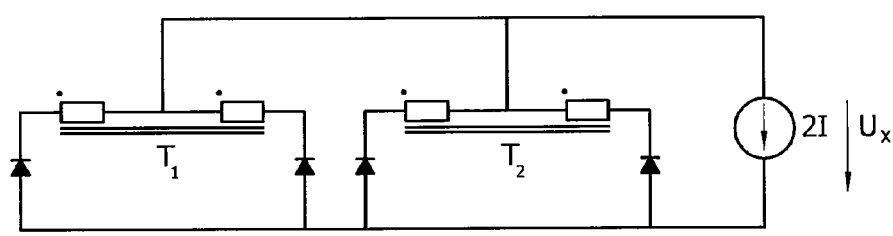

FIGS. 10a to 10c illustrate alternative circuits which may be used for the secondary side of the converter circuits in FIGS. 5 and 7. FIG. 10a shows the parallel arrangement of full bridge rectification circuits already illustrated in FIGS. 5 and 7. FIG. 10b shows a configuration in which two half bridges are used. In order to use this half-bridge arrangement, a small storage inductance is required, having two closely-coupled windings. FIG. 10c illustrates a parallel arrangement of push-pull rectification circuits, using a centre-tapped secondary winding.

Two-Quadrant Operation

The use of active semiconductor switches with freewheeling diodes in both the primary and secondary bridges of the configuration of FIGS. 5 and 7, instead of just in the primary bridges, enables a two-quadrant operation of the circuit. This means that the switching is done on the secondary side of the circuit, and that energy flows from the secondary side to the primary side.

Figure 11A:
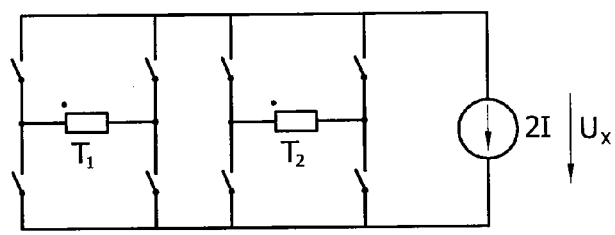
FIGS. 11a, 11b and 11c illustrate how the secondary bridges may be realized using active switches instead of diodes.
Figure 11B:
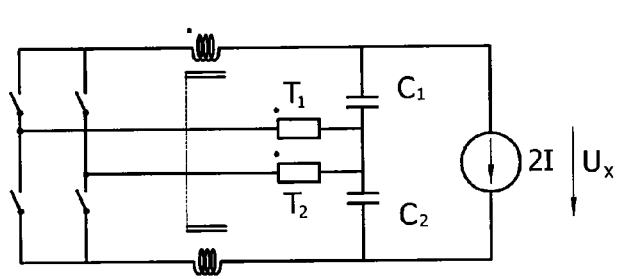
Figure 11C:
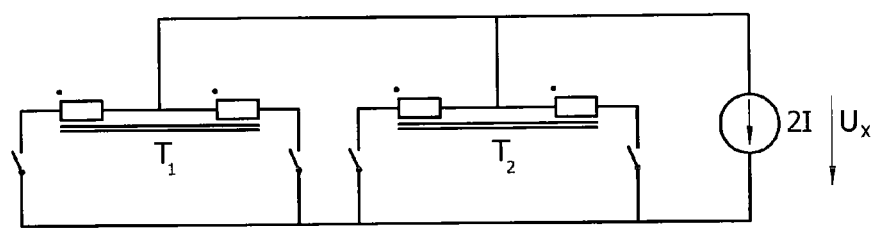

FIGS. 11a to 11c illustrate how the secondary bridges may be realized using active switches instead of diodes. In this reverse operation embodiment (so called second quadrant operation), the switches in the primary side all remain open and function purely as diodes, while the secondary side switches are controlled in exactly the same manner as the sequence already described in FIG. 6 for the primary side switches. The same zero-current commutation is thus induced in the primary side, even though the switching is performed on the secondary side.

Four-Quadrant Operation

Figure 12:
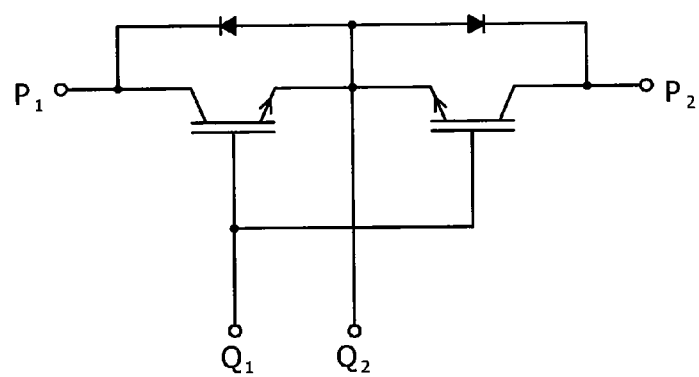
FIG. 12 illustrates an AC switch that allows control of current flow in either direction through a device.

In a further development, semiconductor AC (alternating current) switches can be used in the primary side and the secondary side of the circuit, instead of the single-direction switches used in the two-quadrant arrangement. AC switches allow control of current flow in either direction through the device. An example of such an AC switch is shown in FIG. 12. In the illustrated circuit in FIG. 12, when the circuit is turned on by control signals $Q_1$ and $Q_2$, current can flow in either direction between $P_1$ and $P_2$. The use of AC switches enables a four quadrant operation of the converter circuit, which means that the circuit can be operated such that energy flows either from the primary side to the secondary side or vice versa, and at the same time the signs of the input and output voltages can be either positive or negative.

The invention claimed is:

1. A power converter for maintaining a flow of electrical energy between a first connected circuit and a second connected circuit, the power converter comprising a control unit and two or more converter circuits (1, 2 . . . n), the two or more converter circuits (1, 2 . . . n) being arranged to transfer energy in parallel between said first and second connected circuits, and the power converter being characterized in that:
   each of the two or more converter circuits (1, 2 . . . n) comprises:
   a first converter subcircuit for connecting said each converter circuit (1, 2 . . . n) to the first connected circuit, the first converter subcircuit including a capacitive element (C1, C2 . . . Cn), a second converter subcircuit for connecting said each converter circuit (1, 2 . . . n) to the second connected circuit, the second converter subcircuit including a diode element (D1, D2 . . . Dn) for inhibiting the flow of current from the second connected circuit into the second converter subcircuit of said each converter circuit (1, 2 . . . n), and a switching element (S1, S2 . . . Sn) for, under control of the control unit, permitting or inhibiting current flow between the first converter subcircuit and the second converter subcircuit through an inductive element (L1, L2 . . . Ln) and a transforming element with a transformer winding;

the inductive element (L1, L2 . . . Ln) configured to establish a current flow (I1, I2 . . . In) between the first converter subcircuit and the second converter subcircuit when the switching element is switched to permit current flow through the inductive element (L1, L2 . . . Ln) and to generate a voltage across the capacitive element large enough to commutate the current from one transforming element to another within time available in a predetermined switching cycle;

the power converter being further characterized in that each converter circuit (1,2 . . . n) has at least two possible operation states including: an energy transfer state, in which current flows between the first converter sub circuit and the second converter subcircuit of the said each converter circuit (1, 2 . . . n), and in which the capacitive element (C1, C2 . . . Cn) discharges, and a regeneration state, during which substantially no current flows between the first converter subcircuit and the second converter subcircuit of said each converter circuit (1, 2 . . . n), and during which the capacitive element (C1, C2 . . . Cn) accumulates charge;

the power converter being further characterized in that the control unit is adapted to, according to the predetermined switching cycle, switch each of the two or more converter circuits (1, 2 . . . n), one at a time, into the energy transfer state, such that each converter circuit (1, 2 . . . n) is switched into the energy transfer state for a part of said predetermined switching cycle, and such that the other one or more of the converter circuits (1, 2 . . . n) are in the regeneration state during said part of said predetermined switching cycle;

the transition from the regeneration state to the energy transfer state of said each converter circuit (1, 2 . . . n) being accomplished by, under control of the control unit, operating the switching element (S1, S2 . . . Sn) of said each converter circuit (1, 2 . . . n) to permit current to flow between the first converter subcircuit and the second converter subcircuit of said each converter circuit (1, 2 . . . n), thereby transiently increasing the magnitude of the voltage (Ux) at a common output node (X) such that the diode elements (D1, D2 . . . Dn) in the second converter subcircuits of the said other one or more converter circuits (1, 2 . . . n) become reverse biased, thereby inhibiting current flow in the said other one or more converter circuits (1, 2 . . . n) such that the said other one or more converter circuits (1, 2 . . . n) are held in the regeneration state, in which substantially no current flows in the said other one or more converter circuits (1, 2 . . . n).

2. The power converter according to claim 1, in which the control unit is adapted to control the operation of the switching element (S1, S2 . . . Sn) in each converter circuit (1, 2 . . . n) such that the switching element (S1, S2 . . . Sn) switches off while the respective converter circuit is in its regeneration state, and such that the switching element (S1, S2 . . . Sn) is switched off under zero current conditions.

3. The power converter according to claim 1, in which the transformer of each converter circuit (1, 2 . . . n) is connected via the respective switching element (S1, S2 . . . Sn) to the respective first converter subcircuit, and a second transformer winding connected to the respective second converter subcircuit.

4. The power converter according to claim 3, in which the inductance (L1, L2 . . . Ln) of each converter circuit (1, 2 . . . n) is implemented at least partly by the leakage inductance of the respective transformer.

5. The power converter according to claim 3, in which each secondary transformer winding is centre-tapped and in which each of the said diode elements in each said second converter subcircuit comprises a push-pull arrangement of rectifying diodes, arranged to rectify current flowing between the secondary transformer winding and the second connected circuit.

6. The power converter according to claim 1, in which the first converter subcircuits of the at least two converter circuits (1, 2 . . . n) are connected in series such that voltage across the first connected circuit is shared across the first converter subcircuits of both or all the converter circuits (1, 2 . . . n).

7. The power converter according to claim 1, in which each of the said switching elements (S1, S2 . . . Sn) is implemented as a full-bridge, a half bridge or a push-pull arrangement of semiconductor switches.

8. The power converter according to claim 1, in which each of the said diode elements (D1, D2 . . . Dn) in each said second converter subcircuit comprises a full bridge or a half-bridge arrangement of rectifying diodes.

9. The power converter according to claim 8, in which each rectifying diode is a semiconductor switching device having either an integral diode or a discrete diode connected between its conduction terminals.

10. The power converter according to claim 9, in which the control unit is further configured to control the operation and timing of the said semiconductor switching devices in the second converter subcircuits of said converter circuits (1, 2 . . . n), in such a way as to enable a two-quadrant operation mode of each converter in which, during said energy transfer state, current is allowed to flow either from the first converter subcircuit to the second converter subcircuit or from the second converter subcircuit to the first converter subcircuit of said each converter circuits (1, 2 . . . n), thereby enabling a two-quadrant mode of operation of the power converter in which energy flow may be maintained either from the first connected circuit to the second connected circuit or from the second connected circuit to the first connected circuit.

11. The power converter according to claim 8, in which each rectifying diode and each switching element (S1, S2 . . . Sn) is a semiconductor alternating current switch for, under control of the control unit, selectably inhibiting current flow through it in one or other or both directions.

12. The power converter according to claim 11, in which the control unit is configured to operate the semiconductor alternating current switches such that the power converter operates in four quadrant mode in that it is capable of transferring electrical energy of current and voltage of either polarity, either from the first connected circuit to the second connected circuit, or from the second connected circuit to the first connected circuit.

13. The power converter according to claim 1, wherein the inductive element and the transformer are implemented as distinct elements.

14. The power converter according to claim 1, wherein the capacitive element connected in parallel to the first connected circuit.

* * * * *

UNITED STATES PATENT AND TRADEMARK OFFICE
CERTIFICATE OF CORRECTION

PATENT NO. : 8,908,401 B2
APPLICATION NO. : 13/054978
DATED : December 9, 2014
INVENTOR(S) : Max Hiltbrunner, Urs Christen and Hans-Rudolf Riniker It is certified that error appears in the above-identified patent and that said Letters Patent is hereby corrected as shown below:

Title page, item (73) Assignee name should read "APS Electronic AG"

In the Specification

At line 46 of Column 4 correct "$(D_1, D_2, DO)$" to read "$(D_1, D_2, D_n)$"

Signed and Sealed this
Fourteenth Day of April, 2015

Michelle K. Lee
*Director of the United States Patent and Trademark Office*